United States Patent
Schabel, Jr.

(10) Patent No.: US 12,285,122 B2
(45) Date of Patent: Apr. 29, 2025

(54) MULTI-POSITION ADJUSTABLE FASTENER

(71) Applicant: SLIPCO, LLC, Westlake, OH (US)

(72) Inventor: Norman G. Schabel, Jr., Rocky River, OH (US)

(73) Assignee: SLIPCO, LLC, Westlake, OH (US)

( * ) Notice: Subject to any disclaimer, the term of this patent is extended or adjusted under 35 U.S.C. 154(b) by 331 days.

(21) Appl. No.: 17/519,504

(22) Filed: Nov. 4, 2021

(65) Prior Publication Data
US 2022/0240695 A1 Aug. 4, 2022

Related U.S. Application Data

(60) Provisional application No. 63/074,976, filed on Sep. 4, 2020.

(51) Int. Cl.
*A47G 1/20* (2006.01)
*A47G 1/16* (2006.01)
*F16M 13/02* (2006.01)

(52) U.S. Cl.
CPC ............ *A47G 1/20* (2013.01); *A47G 1/1613* (2013.01); *A47G 1/202* (2013.01); *F16M 13/02* (2013.01)

(58) Field of Classification Search
CPC ........ A47G 1/1613; A47G 1/202; A47G 1/20; A47G 1/164; F16M 13/022; F16M 13/02
USPC ...................................................... 248/475.1
See application file for complete search history.

(56) References Cited

U.S. PATENT DOCUMENTS

| | | | | |
|---|---|---|---|---|
| 1,706,683 A | * | 3/1929 | Victorsohn | A47B 61/003 211/124 |
| 1,835,042 A | * | 12/1931 | Hammer | A47G 1/02 248/225.11 |
| 2,099,332 A | * | 11/1937 | Di Nuccio | A47G 1/162 248/498 |
| 2,117,714 A | * | 5/1938 | Funk | A47H 1/122 248/304 |
| 2,688,901 A | * | 9/1954 | Haugaard | A47G 1/24 248/295.11 |
| 2,898,064 A | * | 8/1959 | Scott | A47G 1/1666 248/496 |
| 3,330,525 A | * | 7/1967 | Weinstein | A47G 1/202 211/116 |
| 3,791,709 A | * | 2/1974 | Cross | A47B 95/008 248/300 |
| 4,149,692 A | * | 4/1979 | Califano | F16M 11/046 248/225.11 |

(Continued)

FOREIGN PATENT DOCUMENTS

| | | | | |
|---|---|---|---|---|
| DE | 102017124261 A1 | * | 4/2019 | ............. A47G 1/164 |
| SE | 527542 C2 | * | 4/2006 | ............. A47F 5/0846 |
| WO | WO-2018078577 A1 | * | 5/2018 | ............. A47G 1/164 |

*Primary Examiner* — Taylor Morris
(74) *Attorney, Agent, or Firm* — Wentsler LLC

(57) ABSTRACT

A fastener assembly includes a base including a front face and a rear face. The base includes one or more mounting openings extending through the front face and the rear face. The fastener assembly includes a mounting fastener received within the one or more mounting openings. The mounting fastener includes a length that is greater than the thickness of the base such that the mounting fastener extends through the mounting opening and engages a surface to attach the base to the surface. One or more fasteners are attached to the front face of the base. The one or more fasteners extend outwardly from the front face.

16 Claims, 17 Drawing Sheets

(56) References Cited

U.S. PATENT DOCUMENTS

| | | | | |
|---|---|---|---|---|
| 4,190,221 A | * | 2/1980 | Updike | F16M 13/00 248/225.11 |
| 4,871,140 A | * | 10/1989 | Hoskinson | A47G 1/162 248/216.1 |
| 5,385,327 A | * | 1/1995 | Hegarty | F16M 11/2014 248/442.2 |
| 6,032,915 A | * | 3/2000 | Brindisi | A47G 1/1613 248/496 |
| 6,152,418 A | * | 11/2000 | Panicci | A47G 1/18 248/496 |
| 6,206,334 B1 | * | 3/2001 | Weck | A47G 1/17 248/467 |
| 6,381,771 B1 | * | 5/2002 | Kelly | A47K 3/003 248/251 |
| 6,663,075 B2 | * | 12/2003 | Zuller | A47G 1/164 248/495 |
| 7,309,053 B2 | * | 12/2007 | Lin | A47G 1/162 248/475.1 |
| 7,352,657 B2 | * | 4/2008 | O'Neill | G04B 37/1406 368/327 |
| 7,448,507 B1 | * | 11/2008 | Abernathy, Jr. | A47G 1/20 211/90.01 |
| 7,497,411 B2 | * | 3/2009 | Weck | A47G 1/202 248/495 |
| 7,654,033 B2 | * | 2/2010 | Kuhn | A01K 97/06 43/57.1 |
| 7,798,463 B2 | * | 9/2010 | Morgenroth | A47F 5/0846 211/106.01 |
| 8,011,635 B2 | * | 9/2011 | Aleo | A47G 1/164 248/217.4 |
| 8,028,429 B2 | * | 10/2011 | Mears | A47G 1/164 33/429 |
| 8,196,889 B2 | * | 6/2012 | Sangiuliano | F16M 13/02 248/475.1 |
| 9,044,090 B2 | * | 6/2015 | Drake | A47B 96/061 |
| 9,057,478 B2 | * | 6/2015 | Chen | F16M 11/10 |
| 10,047,903 B2 | * | 8/2018 | Bruno | F16M 13/02 |
| 2006/0254190 A1 | * | 11/2006 | Hunt | F16M 13/02 52/698 |
| 2007/0095997 A1 | * | 5/2007 | Case | A47G 1/164 248/309.1 |
| 2010/0229442 A1 | * | 9/2010 | Snow | A47G 1/065 40/761 |
| 2016/0081495 A1 | * | 3/2016 | Fuchs | A47G 1/1613 248/477 |
| 2016/0198871 A1 | * | 7/2016 | Hansen | A47G 1/1633 248/477 |
| 2018/0317672 A1 | * | 11/2018 | Taratuta | F16B 11/006 |
| 2019/0008291 A1 | * | 1/2019 | Bacallao | B65B 67/1266 |
| 2019/0159610 A1 | * | 5/2019 | Maynard | A47G 1/1606 |
| 2020/0187676 A1 | * | 6/2020 | Wengerd | A47F 5/0823 |
| 2020/0309318 A1 | * | 10/2020 | Gabbard | D06F 39/125 |
| 2021/0393055 A1 | * | 12/2021 | Rodriguez | F16B 45/00 |
| 2023/0039011 A1 | * | 2/2023 | Amhaz | A47G 1/1613 |

* cited by examiner

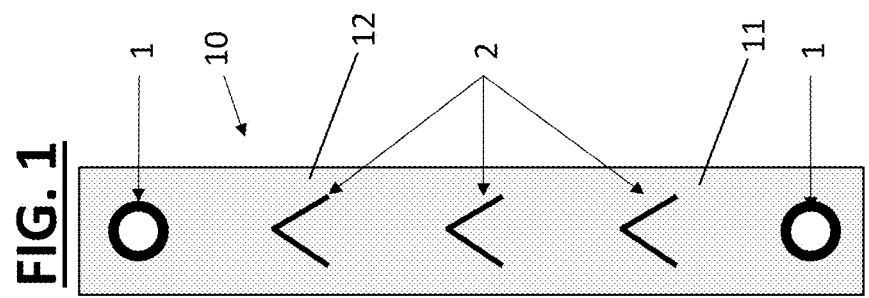
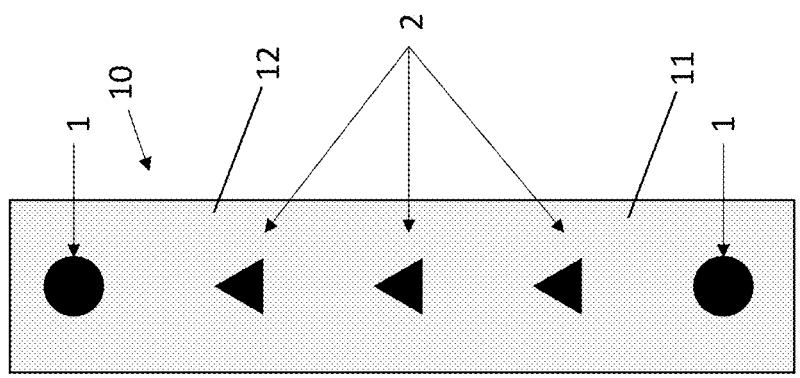
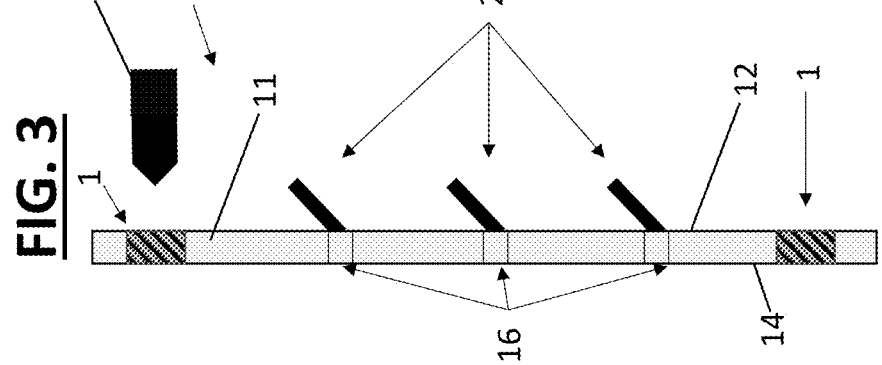

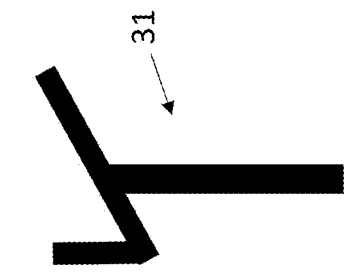
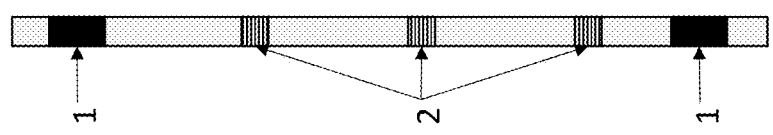
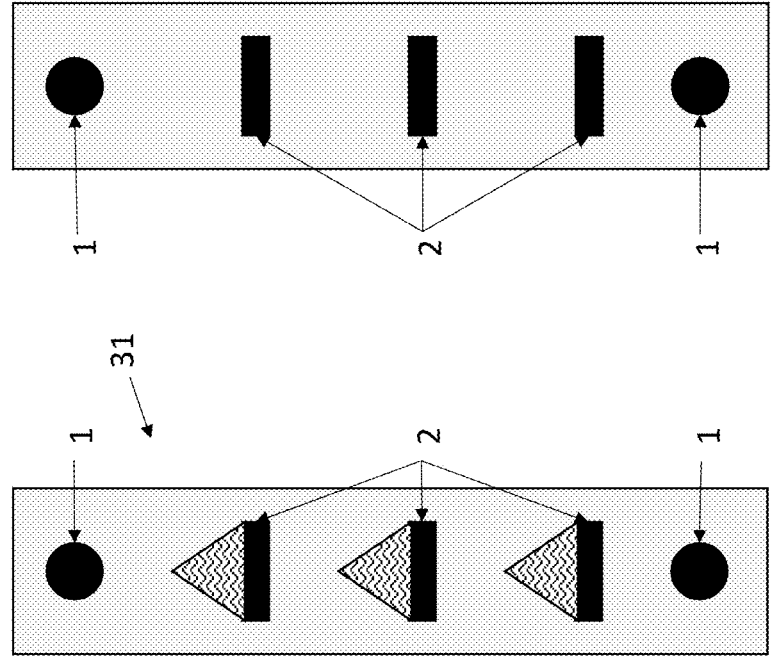

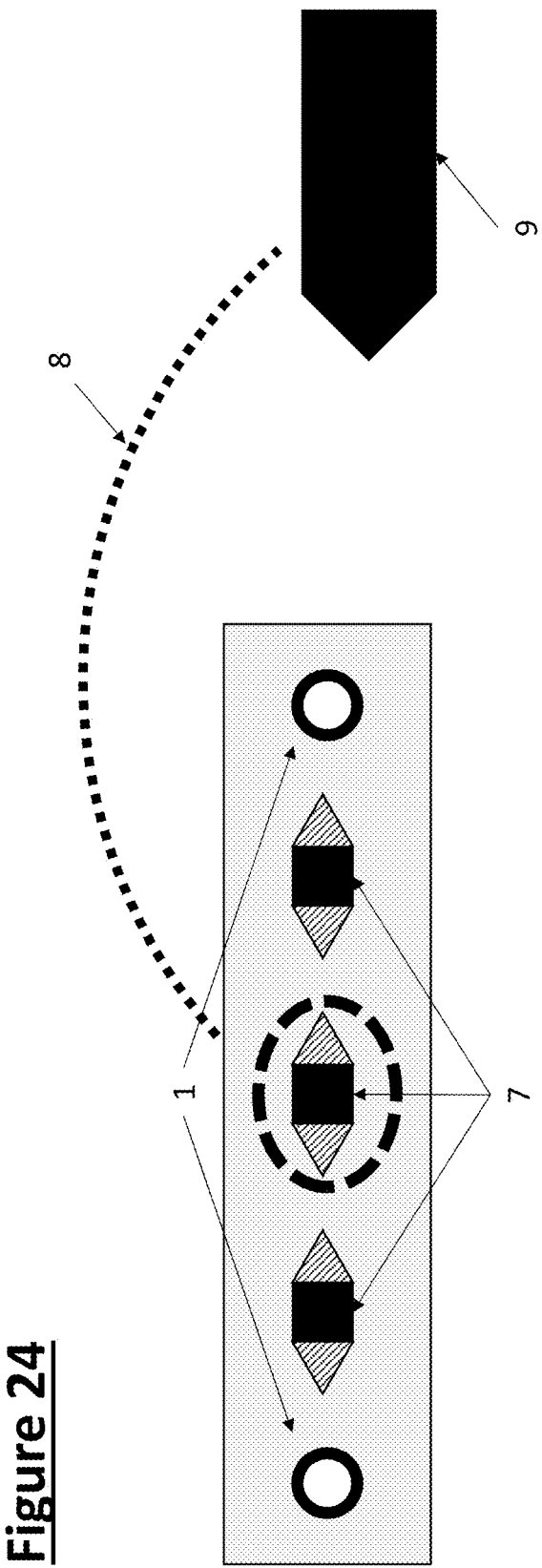

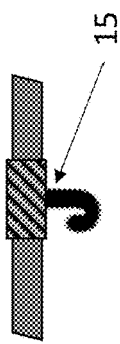
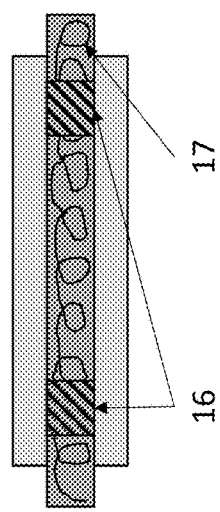
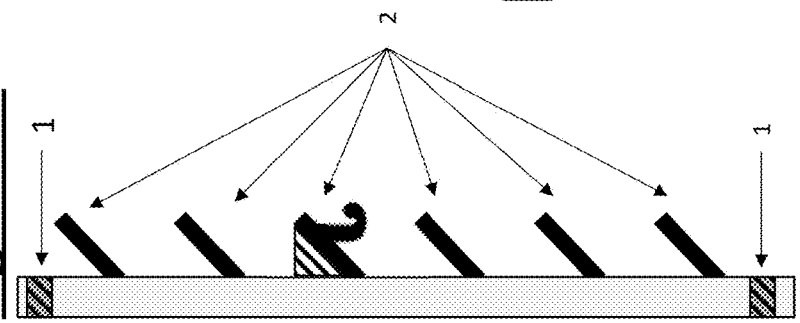
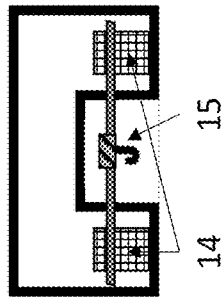
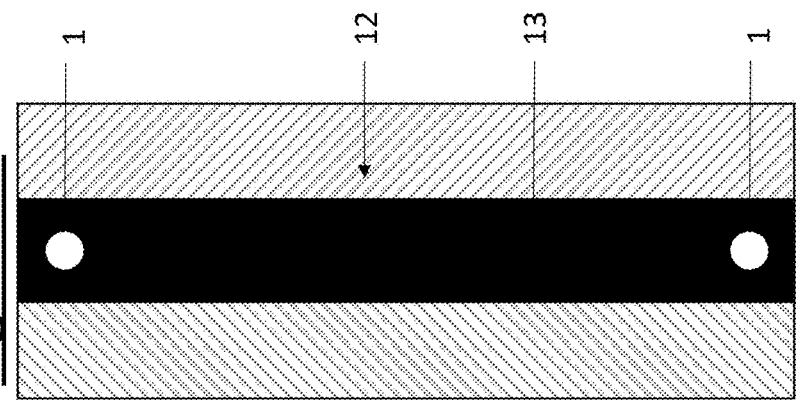

MULTI-POSITION ADJUSTABLE FASTENER

CROSS-REFERENCE TO RELATED APPLICATIONS

This application claims the benefit of priority of U.S. Provisional Application Ser. No. 63/074,976 filed on Sep. 4, 2020 the contents of which are relied upon and incorporated herein by reference in their entirety as if fully set forth below.

FIELD

The present disclosure relates generally to a multi-position adjustable fastener.

BACKGROUND

A typical wall hanging hook assembly involves one or two nails or screws to affix an angled prong or pin to support a framed picture, display item, bracket or other object mounted with a hanger, wire, slot, hole or other positioning method. Once the conventional hook is installed, its position is fixed in both the vertical and horizontal direction without the possibility of modification. While threaded post-driven hooks have been introduced, these can be complex, inconvenient and tedious to adjust and require awkward procedures and often specific tools.

SUMMARY

The following presents a simplified summary of the disclosure to provide a basic understanding of some aspects described in the detailed description.

In aspects, a fastener assembly comprises a base comprising a front face and a rear face such that a thickness of the base is defined between the front face and the rear face. The base comprises one or more mounting openings extending through the front face and the rear face. The base comprises a mounting fastener configured to be received within the one or more mounting openings. The mounting fastener comprises a length that is greater than the thickness of the base such that the mounting fastener extends through the mounting opening and engages a surface to attach the base to the surface. One or more fasteners are configured to be attached to the front face of the base. The one or more fasteners extend outwardly from the front face.

In aspects, the fastener assembly comprises one or more spacer pads attached to the rear face. The one or more spacer pads maintain the rear face a distance apart from the surface when the base is attached to the surface.

In aspects, one or more of the base or the fastener comprises one or more of metal, plastic, wood, mdf, osb, plywood, pressed composite board, cardboard, composite board, formed cementitious or gypsum board, mineral filler, fiber, or other additive modified thermoplastic or thermoset composites, polymer materials such as ABS, PAN, acrylic/PMMA, vinyl/PVC, polyolefin/PP or PE, EPS, PET, PTFE, polycarbonate/PC, PLA, PVA, polyester, urethane, epoxy or other suitable material and copolymer combinations.

In aspects, the base comprises a height that is greater than a width of the base.

In aspects, the base comprises a width that is greater than a height of the base.

In aspects, the one or more fasteners comprise a plurality of fasteners that are pre-positioned on the front face of the base and spaced apart along the front face.

In aspects, the base is attached to an object that is suspended to adapt to a position of an existing fastener or fastener base on a primary surface.

In aspects, a fastener assembly comprises a base comprising a front face and a rear face such that a thickness of the base is defined between the front face and the rear face. The base comprises one or more mounting openings extending through the front face and the rear face. The base comprises a plurality of fastener openings extending through the front face and at least partially through the thickness toward the rear face. The fastener assembly comprises a mounting fastener configured to be received within the one or more mounting openings. The mounting fastener comprises a length that is greater than the thickness of the base such that the mounting fastener extends through the mounting opening and engages a surface to attach the base to the surface. The fastener assembly comprises a fastener configured to be received within the fastener opening. The fastener extends outwardly from the front face.

In aspects, one or more spacer pads are attached to the rear face. The one or more spacer pads maintain the rear face a distance apart from the surface when the base is attached to the surface.

In aspects, one or more of the base or the fastener comprises one or more of metal, plastic, wood, mdf, osb, plywood, pressed composite board, cardboard, composite board, formed cementitious or gypsum board, mineral filler, fiber, or other additive modified thermoplastic or thermoset composites, polymer materials such as ABS, PAN, acrylic/PMMA, vinyl/PVC, polyolefin/PP or PE, EPS, PET, PTFE, polycarbonate/PC, PLA, PVA, polyester, urethane, epoxy or other suitable material and copolymer combinations.

In aspects, the plurality of fastener openings comprise a circular cross-sectional shape.

In aspects, the plurality of fastener openings comprise an elongated cross-sectional shape.

In aspects, the plurality of fastener openings extend through the front face and the rear face.

In aspects, the plurality of fastener openings are joined together to form an elongated channel that extends non-linearly along a plurality of axes.

In aspects, the base is attached to an object that is suspended to adapt to a position of an existing fastener or fastener base on a primary surface.

In aspects, a fastener assembly comprises a base comprising a front face and a rear face such that a thickness of the base is defined between the front face and the rear face. The base comprises one or more mounting openings extending through the front face and the rear face. The base comprises a plurality of fastener openings extending through the front face and at least partially through the thickness toward the rear face. The fastener assembly comprises a mounting fastener configured to be received within the one or more mounting openings. The mounting fastener comprises a length that is greater than the thickness of the base such that the mounting fastener extends through the mounting opening and engages a surface to attach the base to the surface. An elongated rod is configured to be received within the fastener opening. The elongated rod extends outwardly from the front face. A fastener is attached to the elongated rod. The fastener is configured to move along a length of the elongated rod.

In aspects, the elongated rod extends substantially parallel to the front face of the base.

In aspects, the base is attached to a surface to which an object is suspended to adapt to a position of an existing fastener or fastener base on a primary surface.

In aspects, the base is attached to an object that is suspended to adapt to a position of an existing fastener or fastener base on a primary surface.

Additional features and advantages of the aspects disclosed herein will be set forth in the detailed description that follows, and in part will be clear to those skilled in the art from that description or recognized by practicing the aspects described herein, including the detailed description which follows, the claims, as well as the appended drawings. It is to be understood that both the foregoing general description and the following detailed description present aspects intended to provide an overview or framework for understanding the nature and character of the aspects disclosed herein. The accompanying drawings are included to provide further understanding and are incorporated into and constitute a part of this specification. The drawings illustrate various aspects of the disclosure, and together with the description explain the principles and operations thereof.

BRIEF DESCRIPTION OF THE DRAWINGS

These and other features, aspects and advantages are better understood when the following detailed description is read with reference to the accompanying drawings, in which:

FIG. 1 schematically illustrates aspects of a fastener assembly in accordance with aspects of the disclosure;

FIG. 2 schematically illustrates aspects of a fastener assembly in accordance with aspects of the disclosure;

FIG. 3 schematically illustrates aspects of a fastener assembly in accordance with aspects of the disclosure;

FIG. 17 schematically illustrates aspects of a fastener assembly in accordance with aspects of the disclosure;

FIG. 18 schematically illustrates aspects of a fastener assembly in accordance with aspects of the disclosure;

FIG. 19 schematically illustrates aspects of a fastener assembly in accordance with aspects of the disclosure;

FIG. 20 schematically illustrates aspects of a fastener assembly in accordance with aspects of the disclosure;

FIG. 24 schematically illustrates aspects of a fastener assembly in accordance with aspects of the disclosure;

FIG. 40 schematically illustrates aspects of a fastener assembly in accordance with aspects of the disclosure;

FIG. 41 schematically illustrates aspects of a fastener assembly in accordance with aspects of the disclosure;

FIG. 42 schematically illustrates aspects of a fastener assembly in accordance with aspects of the disclosure;

FIG. 43 schematically illustrates aspects of a fastener assembly in accordance with aspects of the disclosure;

FIG. 44 schematically illustrates aspects of a fastener assembly in accordance with aspects of the disclosure;

DETAILED DESCRIPTION

Figure 5:
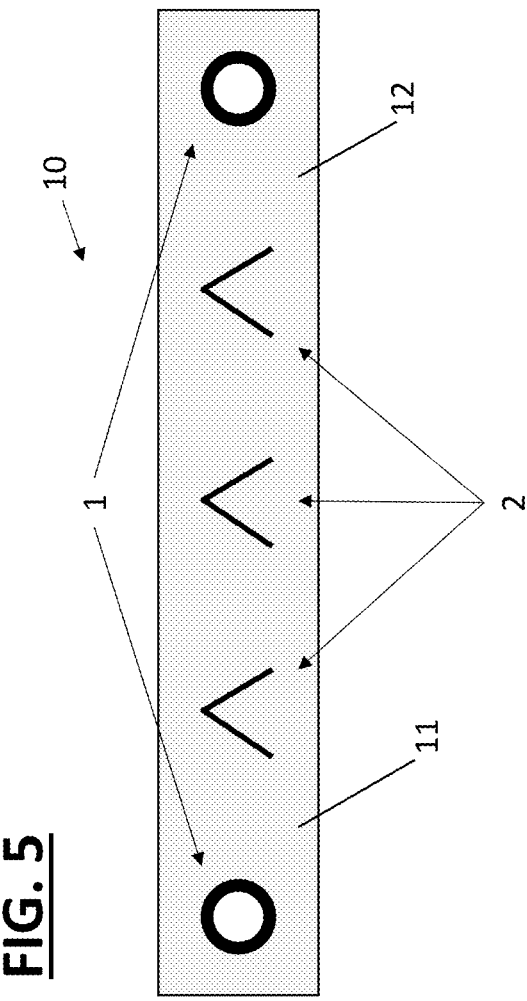
FIG. 5 schematically illustrates aspects of a fastener assembly in accordance with aspects of the disclosure.

Aspects will now be described more fully hereinafter with reference to the accompanying drawings in which example aspects are shown. Whenever possible, the same reference numerals are used throughout the drawings to refer to the same or like parts. However, this disclosure may be embodied in many different forms and should not be construed as limited to the aspects set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, aspects include from the one value to the other value. Similarly, when values are expressed as approximations by use of the antecedent "about," it will be understood that the value forms another aspect. It will be further understood that the endpoints of each of the ranges are significant both in relation to the other endpoint, and independently of the other endpoint.

Directional terms as used herein—for example up, down, right, left, front, back, top, bottom, upper, lower, etc.—are made only with reference to the figures as drawn and are not intended to imply absolute orientation.

Unless otherwise expressly stated, it is in no way intended that any methods set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic relative to arrangement of steps, operational flow, order of components, or orientation of components; plain meaning derived from grammatical organization or punctuation, and; the number or type of aspects described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. The term "substantially" may denote values within about 10% of each other, such as within about 5% of each other, or within about 2% of each other.

Modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first end and a second end generally correspond to end A and end B or two different or two identical ends or the same end.

Figure 8:
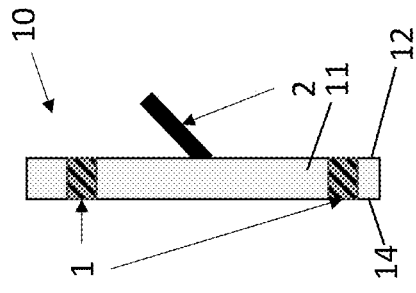
FIG. 8 schematically illustrates aspects of a fastener assembly in accordance with aspects of the disclosure.

The present disclosure relates to a multiple position fastener assembly 10. FIG. 1 illustrates a front view of an embodiment of the fastener assembly 10. The fastener assembly 10 can comprise a base 11 that comprises one or more openings through which the base 11 can receive one or more fasteners. While not limited to such a shape, the base 11 can comprise a substantially rectangular shape in which a height of the base 11 is greater than a width of the base 11. The base 11 can comprise a plurality of faces, for example, a front face 12 and a rear face 14 (e.g., illustrated in FIG. 3). FIG. 2 illustrates a front view of an additional embodiment of the fastener assembly 10, while FIG. 3 illustrates a side view of the fastener assembly 10. In aspects, the front face 12 and the rear face 14 can be substantially planar and may extend substantially parallel to one another. The base 11 can comprise one or more openings, for example, a pair of mounting openings 1. In the illustrated examples, the mounting openings 1 can be positioned at opposing ends of the base 11 and the mounting openings 1 can extend through the base 11 from the front face 12 to the rear face 14. The mounting openings 1 can be arranged along a vertical axis such that an axis intersecting the mounting openings 1 is oriented substantially vertically. While the mounting openings 1 are illustrated as comprising a substantially circular shape, other polygonal shapes (e.g., square, rectangular, triangular, oval, etc.) are envisioned. FIGS. 1, 2, 3 and 4 present a fixed base multiple hook design of vertical configuration which is installed by use of the proper nails and screws using the top and bottom mounting openings 1. FIG. 3 is a side view. In similar fashion, FIGS. 5, 6, 7, and 8 present a fixed base horizontal multiple hook array 2 which is installed by use of proper nails or screws with mounting openings 1 to support the desired weight. FIG. 8 is the side view of this design. In aspects, the mounting base 11 can be mounted to a surface using the mounting openings 1. For example, mounting fasteners 5 (e.g., nails, screws, thumb screws, rivets, pins, prongs, bolts, welds, etc.) can be received through the mounting openings 1 to attach the base 11 to a surface. In aspects, the mounting fasteners can comprise one or more of an adhesive, hook and loop tape, double-sided tape, or magnet that is attached to the rear face 14 to attach the rear face 14 of the base 11 to the surface.

Referring to FIG. 3, a mounting fastener 5 is illustrated in association with the mounting opening 1 of the base 11. In aspects, the mounting fastener 5 is configured to be received within the mounting opening 1 (e.g., by moving the mounting fastener 5 leftward toward the base 11 in FIG. 3). The mounting fastener 5 can comprise a length that is greater than a thickness of the base 11, such that the mounting fastener 5 can extend through the mounting opening 1 and engage a surface to attach the base 11 to the surface. While one mounting fastener 5 is illustrated in FIG. 3, it will be understood that two mounting fasteners 5 may be provided, with each mounting fastener 5 inserted through one of the mounting openings 1. It will further be appreciated that in any embodiment in which the base 11 comprises a mounting opening 1, the mounting fastener 5 of FIG. 3 may be provided for insertion into the mounting opening 1 to attach the base 11 to a surface. As described herein, the mounting fastener 5 can comprise any number of types of fasteners that can pass through the mounting openings 1 and engage a surface. By engaging a surface, the mounting fastener 5 can be received within or penetrate the surface so as to fixedly attach the base to the surface. In aspects, the mounting fastener 5 can comprise a threaded fastener that can engage the surface by being threadingly inserted into the surface.

Figure 55:
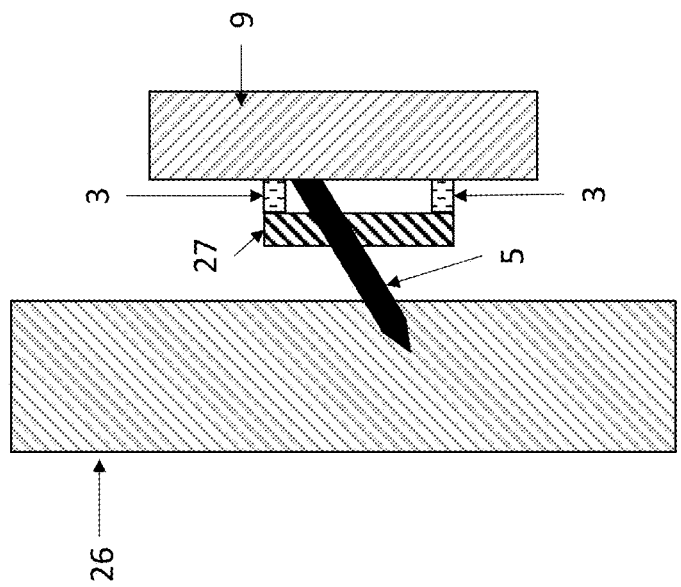
FIG. 55 schematically illustrates aspects of a fastener assembly in accordance with aspects of the disclosure.

The base 11 can comprise a variety of dimensions and materials. For example, the base 11 can comprise one or more of the following materials: metal, plastic, wood, mdf, osb, plywood, pressed composite board, cardboard, composite board, formed cementitious or gypsum board, mineral filler, fiber, or other additive modified thermoplastic or thermoset composites, polymer materials such as ABS, PAN, acrylic/PMMA, vinyl/PVC, polyolefin/PP or PE, EPS, PET, PTFE, polycarbonate/PC, PLA, PVA, polyester, urethane, epoxy or other suitable material and copolymer combinations. The base 11 can be formed in several ways, for example, by being punched, stamped, drilled, die-cut, welded, molded, extruded, cast, fabricated, 3D-printed, or otherwise manufactured to achieve the desired shape and dimensions. In aspects, the base 11 can comprise several shapes, at least some of which are illustrated in FIGS. 1-55. For example, the base 11 can comprise one or more of the following shapes: rectangle, square, triangle, sawtooth, round, rounded, angled, cylindrical, oval, cross, star, arced, curved, etc. While two mounting openings 1 are illustrated in FIGS. 1-3, the base 11 is not so limited, and in aspects, the base 11 can comprise any number (e.g., one or more) of mounting openings 1. In this way, the number and size of the mounting openings 1 may be variable to accommodate the size and shape of the base 11. The illustrations are not intended to limit the number, shape, position, etc. of the mounting openings 1. In aspects, the base 11 can comprise a height that is greater than a width of the base 11 (e.g., illustrated in FIGS. 1-4) or may comprise a with that is greater than a height of the base (e.g., illustrated in FIG. 5).

With reference to FIGS. 1-3, in aspects, the base 11 can comprise a height that is within a range from about 20 millimeters (mm) to about 60 mm, or about 40 mm high. In aspects, the base 11 can comprise a width (e.g., across the front face 12) that is within a range from about 50 mm to about 150 mm, or about 90 mm wide. In aspects, the base 11 can comprise three openings located between the mounting openings 1, wherein the openings are spaced apart along a height of the base 11 and can receive or accommodate one or more fasteners 2. For example, each of the openings can receive a single hook 2, such that the fasteners 2 may be spaced apart vertically along a height of the base 11. In aspects, the fasteners 2 can be separated by a dimension that is within a range from about 10 mm to about 30 mm, or about a 20 mm separation. As illustrated in FIG. 3, the fasteners 2 can extend outwardly from the front face 11, for example, by extending a distance that is within a range from about 10 mm to about 20 mm, or about 15 mm extension at a 45 degree angle relative to the front face 11. However, as noted above regarding the materials, shapes, dimensions, etc. the aforementioned dimensions of the fasteners 2 are not intended to be limiting, and other dimensions or angles are envisioned. The base 11 can comprise the front face 12 and the rear face 14 such that a thickness of the base 11 may be defined between the front face 12 and the rear face 14.

Figure 4:
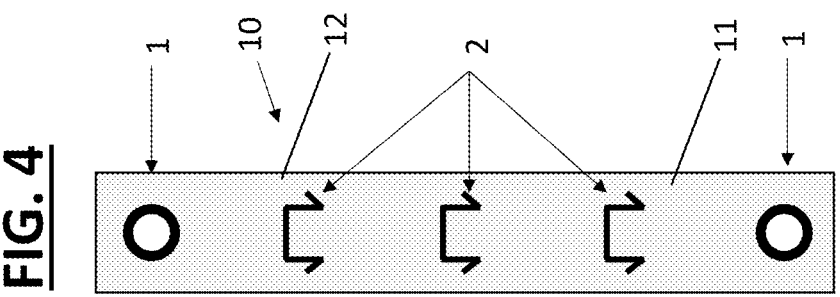
FIG. 4 schematically illustrates aspects of a fastener assembly in accordance with aspects of the disclosure.
Figure 6:
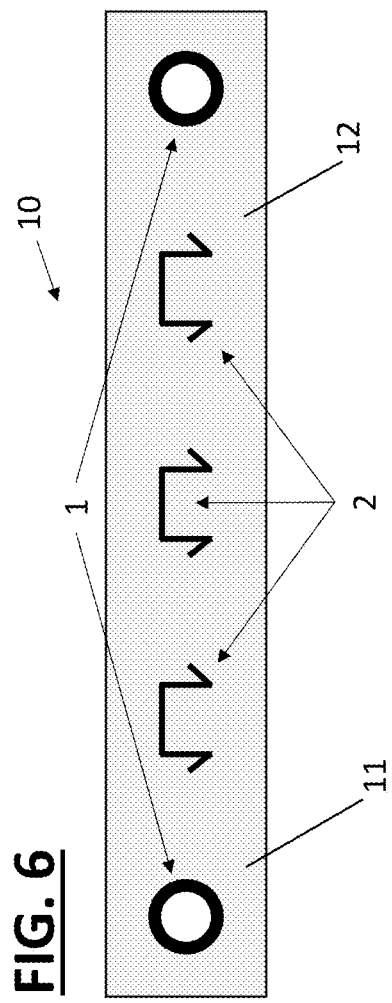
FIG. 6 schematically illustrates aspects of a fastener assembly in accordance with aspects of the disclosure.
Figure 7:
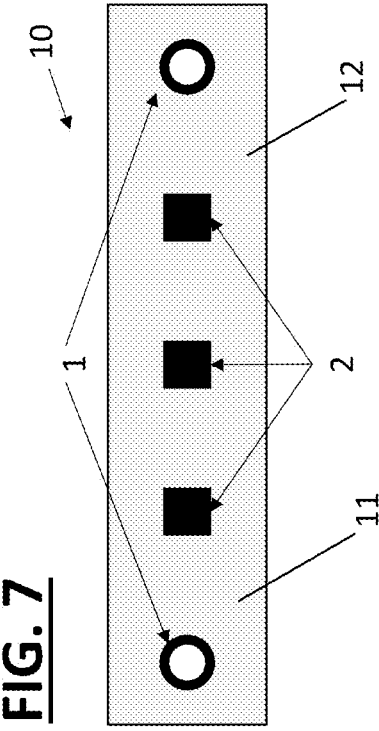
FIG. 7 schematically illustrates aspects of a fastener assembly in accordance with aspects of the disclosure.

FIGS. 4-5 are similar in some respects to the embodiments illustrated in FIGS. 1-3. For example, the embodiment illustrated in FIG. 4 can comprise a vertically-oriented base 11 with the mounting openings 1 spaced apart along a vertical axis and the fasteners 2 spaced apart between the mounting openings 1. As illustrated in FIG. 4, the fasteners 2 can comprise a different shape from the fasteners of FIGS. 1-3. FIG. 5 illustrates an embodiment in which the base 11 may be oriented horizontally with the mounting openings 1 spaced apart along a horizontal axis. The fasteners 2 illustrated in FIG. 5 may be similar to the fasteners 2 illustrated in FIG. 1, though, other types of fasteners 2 may be received within the base 11 of FIG. 5. FIG. 6-8 illustrate further embodiments of the fastener assembly 10, wherein the base 11 is oriented horizontally, similar to FIG. 5. As illustrated in FIGS. 6-8, several different types of fasteners 2 can be used with the horizontally-oriented base 11. In aspects, the fasteners 2 can be arranged in a plurality of rows and a plurality of columns.

Figure 10:
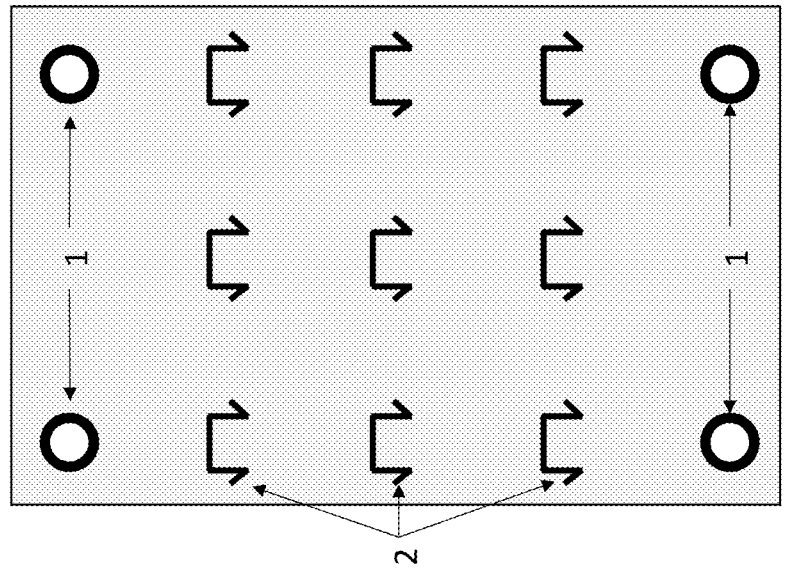
FIG. 10 schematically illustrates aspects of a fastener assembly in accordance with aspects of the disclosure.
Figure 9:
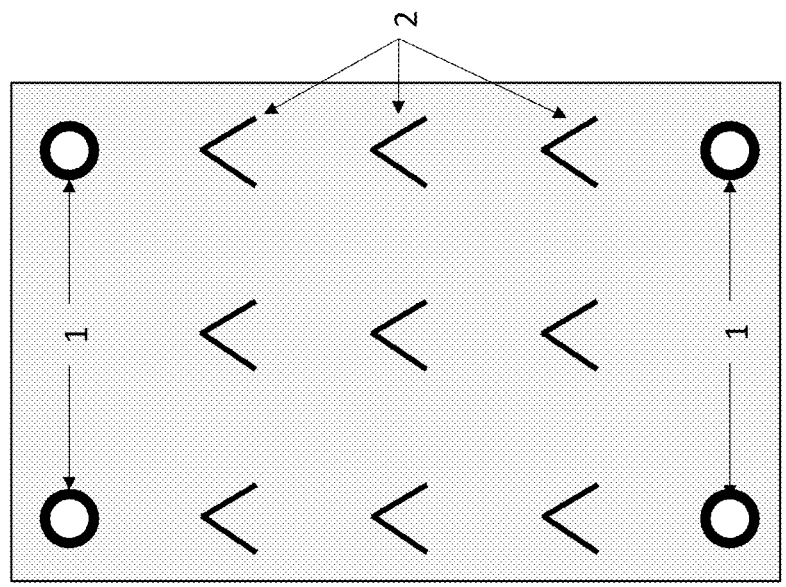
FIG. 9 schematically illustrates aspects of a fastener assembly in accordance with aspects of the disclosure.

FIGS. 9-10 illustrate another embodiment of the base 11, wherein the base 11 comprises a plurality of openings that are arranged in a plurality of rows and a plurality of columns. In aspects, the base 11 can comprise more than the two mounting openings 1 that are illustrated in FIGS. 1-8. Rather, in FIGS. 9-10, the base 11 can comprise four mounting openings 1 that are arranged at the corners of the generally rectangularly shaped base 11. In aspects, the base 11 can comprise a plurality of rows of fasteners 2 (e.g., three rows in the illustrated embodiments) and three columns of fasteners 2 (e.g., three columns in the illustrated embodiments). It will be appreciated that any number of rows or columns (e.g., one or more rows and one or more columns) may be provided in the base 11. In this way, FIGS. 9 and 10 illustrate both vertical and horizontal pattern of fasteners 2 to present larger coverage of space, with corresponding increase in adjustment ranges, using one of numerous arrangements for mounting openings 1. In an embodiment, as an example, an acrylic polymer sheet of about 5 mm thickness, 100 mm width and 100 mm height could have 9 evenly spaced fasteners 2 of 12 mm base, 12 mm extension and 45-degree angle.

Figure 16:
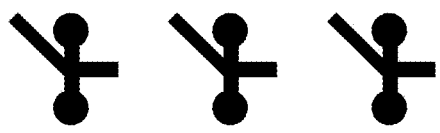
FIG. 16 schematically illustrates aspects of a fastener assembly in accordance with aspects of the disclosure.
Figure 15:
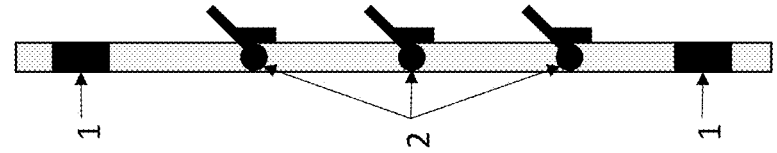
FIG. 15 schematically illustrates aspects of a fastener assembly in accordance with aspects of the disclosure.
Figure 14:
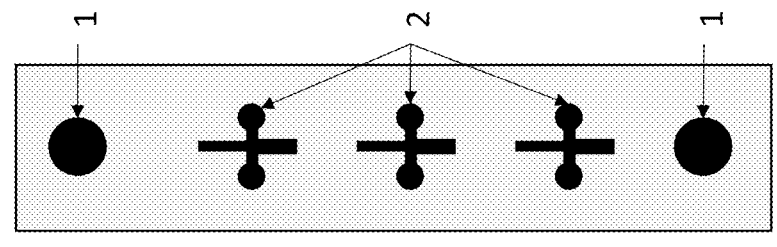
FIG. 14 schematically illustrates aspects of a fastener assembly in accordance with aspects of the disclosure.
Figure 13:
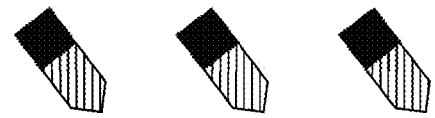
FIG. 13 schematically illustrates aspects of a fastener assembly in accordance with aspects of the disclosure.
Figure 12:
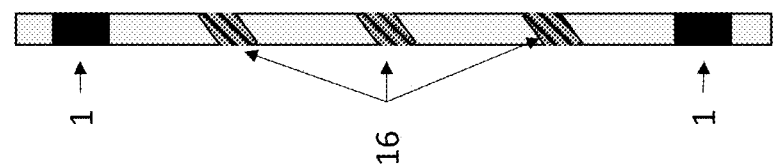
FIG. 12 schematically illustrates aspects of a fastener assembly in accordance with aspects of the disclosure.
Figure 11:
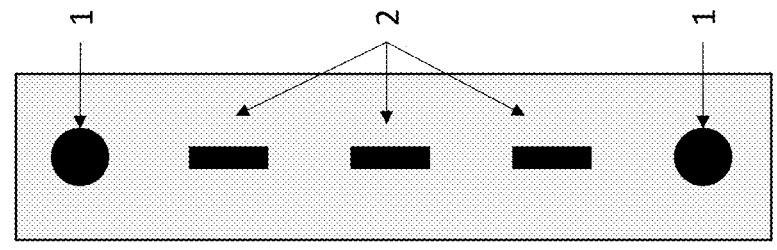
FIG. 11 schematically illustrates aspects of a fastener assembly in accordance with aspects of the disclosure.

FIGS. 11-16 illustrate further embodiments of a vertically-oriented base 11. For example, FIG. 11 illustrates a vertically-mounted base 11 with fastener openings 16 that may be threaded. For example, FIG. 12 illustrates a side-view of the base 11, wherein the fastener openings 16 can extend through the base 11 from the front face 12 to the rear face 14. In aspects, the fastener openings 16 can comprise several variations. For example, as illustrated, the fastener openings 16 can be threaded, for example, with a threaded surface defining the circular fastener openings 16. The threaded fastener openings 16 provide several benefits. For example, the threaded fastener openings 16 can receive threaded fasteners 2 such that a desired fastener position can be achieved and the threaded fasteners 2 can be limited or prevented from inadvertently being removed from the threaded fastener openings 16. In aspects, the threaded fasteners 2 can comprise pins, screws, or the like. While the fastener openings 16 are illustrated as being threaded in FIGS. 11-16, zero or more of the embodiments illustrated herein can comprise threaded fastener openings 16. For example, in aspects, some, or all, of the embodiments illustrated in FIGS. 1-10 may comprise threaded fastener openings 16. However, in aspects, some, or all, of the embodiments illustrated in FIGS. 1-10 may comprise non-threaded fastener openings 16, such as, for example, when a smooth surface defines the fastener openings 16. In aspects, the fasteners 2 can be received within the fastener openings 16 and may project outwardly from the front face 12 of the base 11. The fasteners 2 can form an angle (e.g., illustrated in FIGS. 14-15) such that the fasteners 2 can receive or support an object thereon. Examples of the fasteners 2 are illustrated in FIGS. 13 and 16. FIG. 14 illustrates a vertically-oriented base 11 similar to FIG. 11, but using a functional two-prong pin and bracket fastener of FIG. 16 to achieve a desired position with an array of optional installation points. FIG. 15 is a side-view showing the mounting openings 1 and the positions of the fasteners 2.

It will be appreciated that in the embodiments illustrated in FIGS. 1-21, some or all of the embodiments may comprise a base with fastener openings, and some or all of the embodiments may comprise a base without fastener openings. For example, in aspects, zero or more of the mounting bases 11 can comprise the fastener openings 16 into which the fasteners 2 can be received. Conversely, in aspects, zero or more of the mounting bases 11 may not comprise fastener openings 16. Rather, the fasteners 2 can be attached directly to the front face of the bases 11 without being inserted into fastener openings 16. In particular, the fasteners 2 can be attached to the front face of the bases 11 (e.g., by welding, adhesives, one-piece formed, magnets, etc.). Accordingly, the fastener assembly 10 can comprise the one or more fasteners 2 that are configured to be attached to the front face of the base, with the one or more fasteners 2 extending outwardly from the front face.

In aspects, the base 11 can comprise a plurality of fastener openings 16 that can extend through the front face 12 and at least partially through the thickness of the base 11 toward the rear face 14. As used herein, by being at least partially through the thickness, the fastener openings 16 can extend partially or completely through the base 11. For example, in aspects (e.g., as illustrated in FIGS. 11-15), the fastener openings 16 can extend completely through the base 11 from the front face 12 through the rear face 14, such that the fasteners 2 can extend entirely through the fastener openings 16 of the base 11. However in aspects, the fastener openings 16 may extend only partially through the thickness, such as by forming an indent in the front face 12 but not extending entirely through the base 11 and the rear face 14.

FIG. 17 illustrates additional embodiments of the vertically-oriented base 11, comprising a functional angled prong 31. The angled prong 31, which is also illustrated in FIG. 20, can be received within the fastener openings 16 of the base 11. The prong 31 can be installed in available slots or notches (e.g., the fastener openings 16) of the base 11 as illustrated in FIG. 18, to achieve a desired final position. FIG. 19 illustrates a side view of the mounting base 11 of FIG. 18, with the mounting holes 1.

Figure 21:
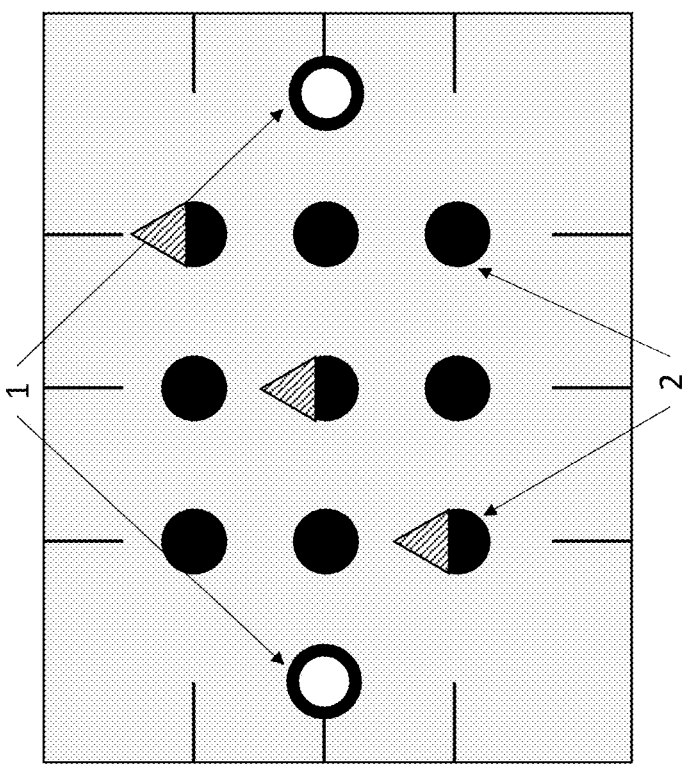
FIG. 21 schematically illustrates aspects of a fastener assembly in accordance with aspects of the disclosure.
Figure 22:
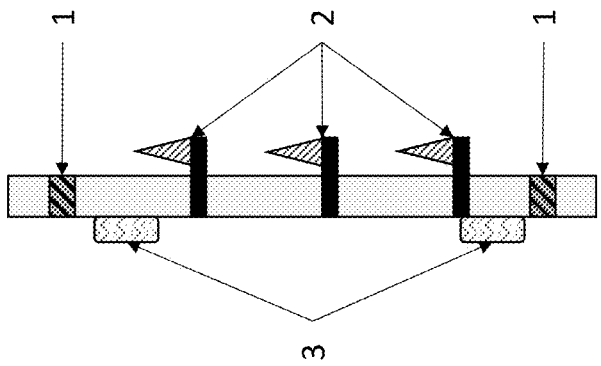
FIG. 22 schematically illustrates aspects of a fastener assembly in accordance with aspects of the disclosure.
Figure 23:
FIG. 23 schematically illustrates aspects of a fastener assembly in accordance with aspects of the disclosure.

FIG. 21 illustrates additional embodiments of the base 11, wherein the base 11 comprises a plurality of fastener openings 16 in both a vertical and horizontal pattern that allow the insertion of the fasteners 2 (e.g., peg, pin, screw or hook and/or the fastener 2 illustrated in FIG. 23) into a desired position. The base 11 of FIGS. 21 and 22 may be similar to the base 11 of FIGS. 9 and 10, wherein the base 11 can comprise the fastener openings 16 arranged in a plurality of rows and a plurality of columns. FIG. 22 illustrates a side view of the base 11 comprising the mounting openings 1, cushioning pads 3, and fasteners 2 (e.g., hooks). In aspects, an example fastener 2 is illustrated in FIG. 23, wherein the fastener 2 comprises a post 4, a holding tab 6, and a suspension hook 5. Other possible designs and configurations are envisioned, such that the fasteners 2 are not limited to the embodiments illustrated in FIGS. 13, 16, and 20.

FIG. 24 illustrates a horizontal base 11 comprising fastener openings 16 that may use fasteners 2 (e.g., fixed cleats, bolts, posts, bollards, snaps, clips, or brackets 7) in a lateral application with a cable, loop, rope, line or strap 8 that can restrain or hold a curtain, tarpaulin, ship, boat, vessel, vehicle, apparatus, mechanical assembly, or other object 9 with quick attachment and adjustment. In aspects, the base 11 can also be configured with detachable and repositionable fasteners as optional design, and the base itself can utilize detachable and repositionable fasteners.

Figure 28:
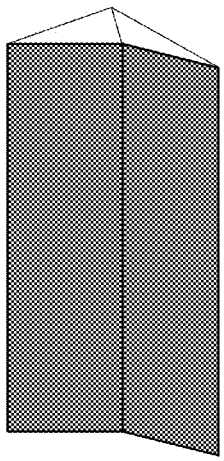
FIG. 28 schematically illustrates aspects of a fastener assembly in accordance with aspects of the disclosure.
Figure 29:
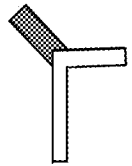
FIG. 29 schematically illustrates aspects of a fastener assembly in accordance with aspects of the disclosure.
Figure 26:
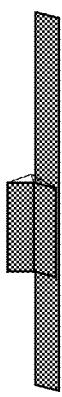
FIG. 26 schematically illustrates aspects of a fastener assembly in accordance with aspects of the disclosure.
Figure 27:
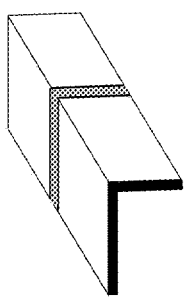
FIG. 27 schematically illustrates aspects of a fastener assembly in accordance with aspects of the disclosure.
Figure 25:
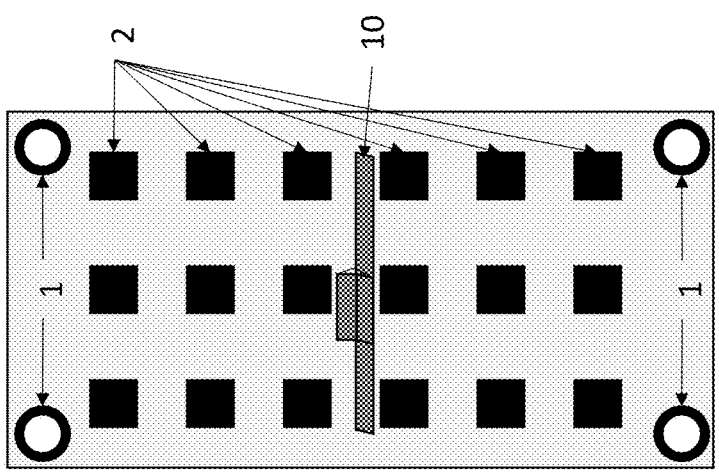
FIG. 25 schematically illustrates aspects of a fastener assembly in accordance with aspects of the disclosure.
Figure 33:
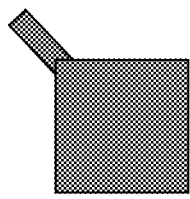
FIG. 33 schematically illustrates aspects of a fastener assembly in accordance with aspects of the disclosure.
Figure 34:
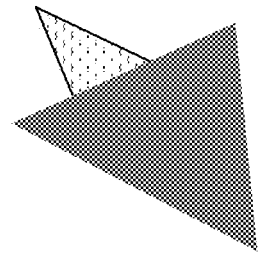
FIG. 34 schematically illustrates aspects of a fastener assembly in accordance with aspects of the disclosure.

FIG. 25 illustrates an embodiment of the base 11 in which pre-positioned extensions or brackets 2 can provide support for a bar or rod 10 of various shapes. For example, the rod 10 can rest upon the brackets 2. The rod accommodates a functional sleeve or hollow ring fastener of corresponding shape that slides along the rod, thus providing quick and accurate adjustment of the fastener position. FIG. 26 illustrates a two-sided or angled bar that can be effectively held on the mounting base with complimentary shaped brackets, while FIG. 29 presents a side view of this assembly. FIG. 27 illustrates a plan view of the functional angled sleeve hook that can be moved side-to-side on the angled bar. FIG. 28 illustrates a side view of the functional angled sleeve hook, wherein the dimensions can fit the design.

Figure 30:
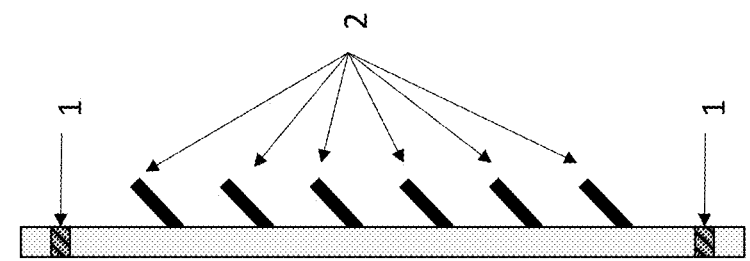
FIG. 30 schematically illustrates aspects of a fastener assembly in accordance with aspects of the disclosure.

FIG. 30 illustrates a side view of the base 11 of FIG. 25 with mounting holes 1 with pre-positioned extension supports or brackets 2. FIGS. 31-34 illustrate square and triangular shaped rods and corresponding multi-sided functional sleeve hooks. In aspects, other possible shapes are envisioned, however, for example, beams, cylinders, rectangles, oval shapes, etc. For example, in aspects, the rods can comprise a combination of shapes in which the ends of the rods can be different geometry to allow for alternate installation and methods of applications. In aspects, a rod can comprise a non-constant cross-sectional shape and/or a non-constant cross-sectional size along a length of the rod.

Figure 35:
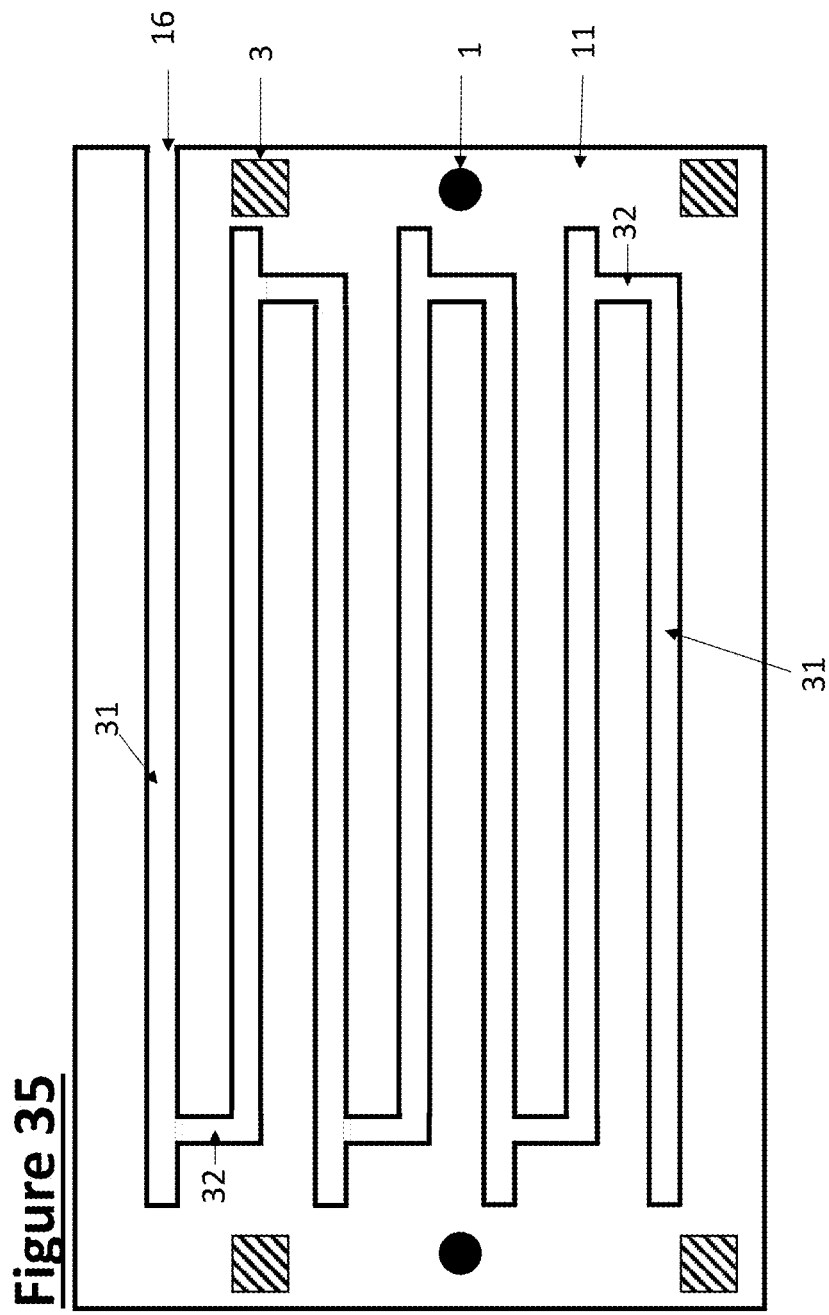
FIG. 35 schematically illustrates aspects of a fastener assembly in accordance with aspects of the disclosure.
Figure 36:
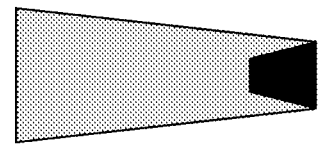
FIG. 36 schematically illustrates aspects of a fastener assembly in accordance with aspects of the disclosure.
Figure 37:
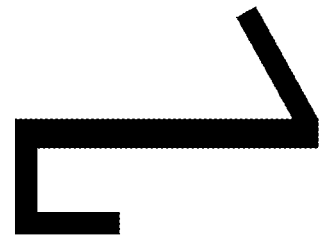
FIG. 37 schematically illustrates aspects of a fastener assembly in accordance with aspects of the disclosure.
Figure 38:
FIG. 38 schematically illustrates aspects of a fastener assembly in accordance with aspects of the disclosure.
Figure 39:
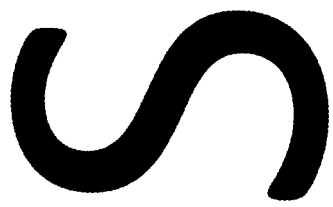
FIG. 39 schematically illustrates aspects of a fastener assembly in accordance with aspects of the disclosure.

FIG. 35 illustrates a base 11 comprising interconnected grooves or channels 16 that can allow a fastener (e.g., similar to the fasteners illustrates in FIGS. 36-39) to be inserted and readily moved in horizontal or vertical directions to achieve desired placement. For example, the base 11 of FIG. 35 comprises the fastener opening 16 that is comprised of a plurality of fastener opening portions, for example, first fastener opening portions 31, second fastener opening portions 32, etc. In aspects, the first fastener opening portions 31 can extend horizontally and are spaced apart from each other to extend parallel along different axes. In aspects, the second fastener opening portions 32 can extend vertically and are spaced apart from each other to extend parallel along a plurality of axes. In aspects, the first fastener openings portions 31 and the second fastener opening portions 32 can be attached or interconnected to form a continuous groove or channel (e.g., the fastener opening 16) that extends from one corner of the mounting base 11 to an opposing corner of the mounting base 11. Due to the material and dimensions of the mounting base 11, the mounting base 11 may remain rigid and non-movable while providing the elongated, interconnected fastener opening 16 comprising the elongated cross-sectional shape that extends non-linearly along a plurality of axes.

In aspects, the cushioning pads 3 can be attached to a reverse face of the base 11 of FIG. 35. In aspects, a composite board of about 5 mm thickness, 130 mm width and 90 mm height could have a plurality (e.g., 4, or 5, or 6) evenly spaced and interconnecting channels or grooves of about 3 mm to about 4 mm height and about 95 mm width to accommodate the Z-hook of FIGS. 36-37. The top row or one or more other rows can provide an opening for the fastener to be inserted. In aspects, the rear face of the base 2 can comprise four spacer pads of 5 mm thickness and be 10 mm square to allow placement of the fastener. The locations of the four spacer pads are illustrated with cross-hatching in FIG. 35. The one or more spacer pads can be attached to the rear face of the base 2 such that the one or more spacer pads can maintain the rear face a distance apart from a surface to which the base is attached. In aspects, the spacer pads can limit contact between the rear surface of the base and the surface, thus limiting damage to the rear surface of the base or the primary surface. The spacer pads can comprise a cushioning material, for example, washers, o-rings, wedges, etc. that can limit contact between the base and a surface to provide spacing and/or cushioning. In aspects, the spacers can be installed in combination with the mounting fasteners (e.g., the mounting fasteners 5 can be inserted through the mounting openings, with the spacer pads receiving the mounting fasteners 5 through an opening in the spacer pads).

FIG. 40 illustrates an additional embodiment of the base 11. In aspects, the base 11 can comprise a front face comprising a non-planar shape. For example, the base 11 can comprise an H-shaped channel design or a U-shaped channel design that can facilitate the adjustment of a slide bar fastener assembly 15 (e.g., illustrated in FIG. 43). In aspects, an example can comprise a J-hook apparatus that is illustrated in FIG. 43, which may be held on a bracket 14. For example, FIG. 41 illustrates a top-down illustration of FIG. 40, wherein the slide bar fastener assembly 15 can be received within outcroppings of the base 11. In aspects, this configuration can be open array or closed configuration by modification of the width of the channel extension 12 and modification of the fastener bar assembly design (e.g., depending on whether there is a desire to allow the removal of the fastener). In aspects, other shapes of rods and fastener bars, as well as corresponding bracket geometries are envisioned. These shapes can comprise the examples of FIGS. 31-32, as well as spring tension rods illustrated in FIG. 44, slip bar rods, twist shackle bars and the like. As illustrated in FIG. 44, the spring tension rod can comprise a spring in a center of the rod that can bias the rod into a fully-extended position (e.g., as shown). The rod can be compressed, for example, by compressing the spring, which can allow the rod to be inserted into the openings in the base 11 (e.g., as illustrated in FIG. 41).

Figure 45:
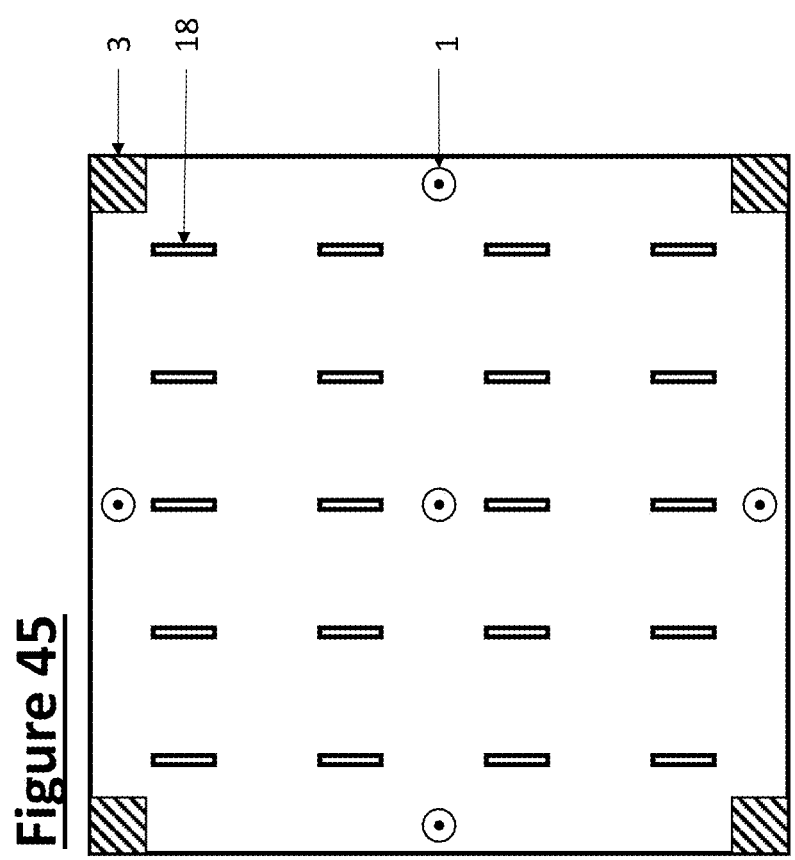
FIG. 45 schematically illustrates aspects of a fastener assembly in accordance with aspects of the disclosure.
Figure 49:
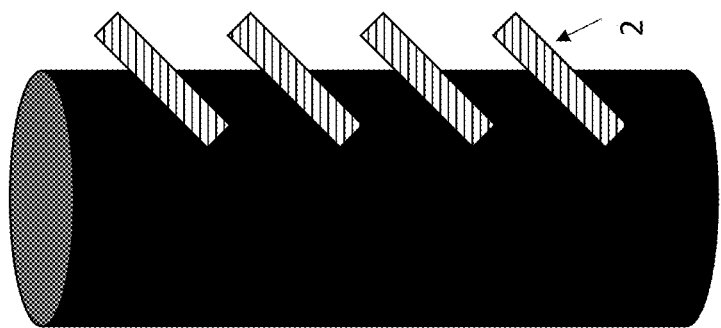
FIG. 49 schematically illustrates aspects of a fastener assembly in accordance with aspects of the disclosure.
Figure 48:
FIG. 48 schematically illustrates aspects of a fastener assembly in accordance with aspects of the disclosure.
Figure 47:
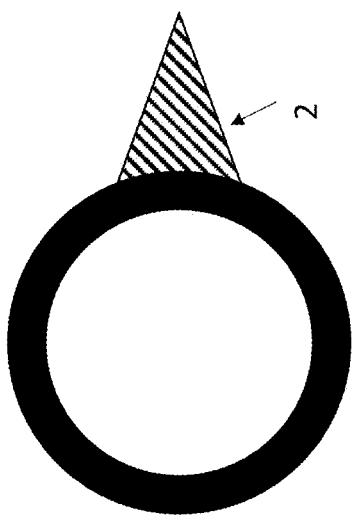
FIG. 47 schematically illustrates aspects of a fastener assembly in accordance with aspects of the disclosure.
Figure 46:
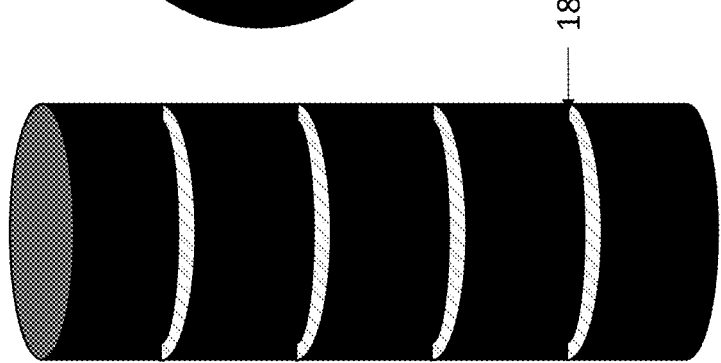
FIG. 46 schematically illustrates aspects of a fastener assembly in accordance with aspects of the disclosure.

FIG. 45 illustrates the base 11 with a plurality of notches or grooves 18 that extend through the base 11. In aspects, the grooves 18 can receive various fasteners or hooks (e.g., in a vertical or horizontal design) while allowing quick removal and repositioning in either direction as needed. In aspects, the fasteners or hooks can comprise those illustrated and described in FIGS. 13, 16, 20, 23, and 36-39. In aspects, a molded ABS base can comprise dimensions of about 5 mm thickness, about 130 mm width, and about 90 mm height, and may have 12 evenly spaced notches or grooves that may be about 3 to about 3.5 mm width and about 8 mm height. These grooves can accommodate the S-hook of FIG. 39 to be affixed in a desired position. In aspects, a rear side of the base 11 can comprise 4 spacer pads that may be about 5 mm in thickness and about 10 mm square to allow placement of the fastener. FIG. 46 illustrates an example of a cylindrical base that can be either solid or hollow and can accommodate various ring or circular fasteners. FIG. 47 illustrates a fixed ring and fastener, although various types of adjustable collars can be employed. FIGS. 48-49 illustrate the cylindrical base in side view comprising internal grooves and external notches, respectively.

Figure 52:
FIG. 52 schematically illustrates aspects of a fastener assembly in accordance with aspects of the disclosure.
Figure 50:
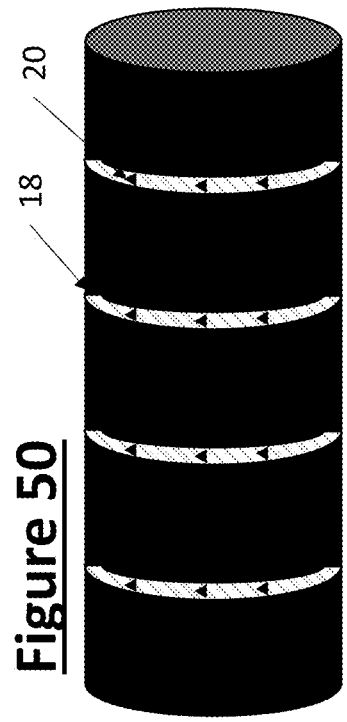
FIG. 50 schematically illustrates aspects of a fastener assembly in accordance with aspects of the disclosure.
Figure 53:
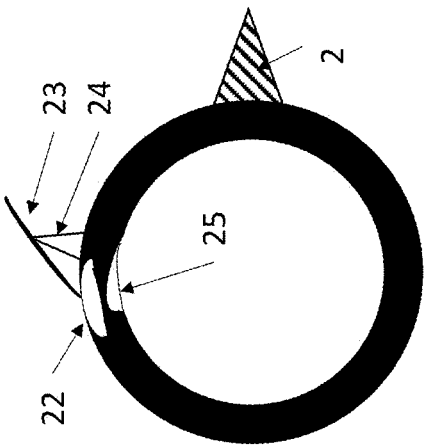
FIG. 53 schematically illustrates aspects of a fastener assembly in accordance with aspects of the disclosure.
Figure 51:
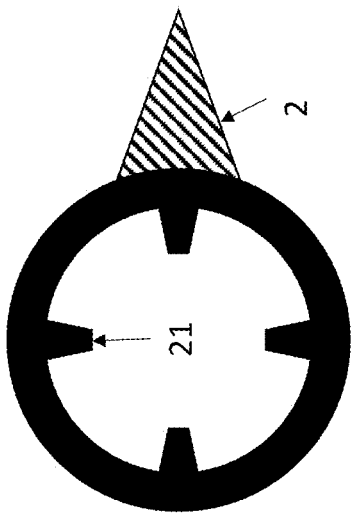
FIG. 51 schematically illustrates aspects of a fastener assembly in accordance with aspects of the disclosure.

FIG. 50 illustrates a cylindrical base or rod design with notches or grooves that can comprise sprockets or teeth, which correspond to the fastener ring design of FIG. 51 which can comprise teeth that can be set to prevent rotation of the ring when placed. FIGS. 52 and 53 show an open and closed ring clamp design that provides quick placement and easy adjustment of fixture position on a cylindrical base. FIG. 55 illustrates the use of a mounting base 27 in reverse position mounted with suitable spacer or cushioning pads 3 to an object 9 and utilizing an existing single position hook, nail or pin 5 attached to a surface 26 to achieve horizontal, vertical or lateral adjustment with multiple positions. The attachment of the mounting base to the object can be achieved by various means including but not limited to nails, screws, pins, rivets, adhesive, magnets, double sided tape, Velcro or burr faced tape and the like. Further, the mounting base and surfaces can be of flat, curved, angled or other geometries and still utilize the reverse position mounting and achieve retrofit of an existing fixture. In aspects, the mounting base can be attached to a primary surface or an object being held or suspended.

In aspects, the rectangular, square, triangular, cylindrical, I-beam, H-beam, U-beam and other shapes and geometries of bars and corresponding sliding sleeve hooks and fasteners can be used in association with any of the FIGS. Illustrated here. Further, the fasteners can be configured in fixed rather than moveable design. Likewise, the shape and number of pre-positioned extensions support brackets is variable. Further, the method of providing extension support brackets could be similar to the designs of FIGS. 11-25 so that they can detachable and installed when the mounting base is affixed and only used in a single required position. In aspects, the configuration of FIGS. 11, 14 and 17 can be shown in the horizontal design of FIGS. 5 and 6, or in the combined vertical and horizontal pattern of FIGS. 9 and 10. In the same manner, the design of FIG. 21 could also be shown as either vertical or horizontal configuration.

As used herein, the fasteners (e.g., the fasteners or mounting fasteners) can comprise a variety of configurations, sizes, and shapes. For example, the fasteners can comprise one or more of nails, pins, prongs, posts, screws, thumbscrews, threaded rods, bolts, slip rods, pegs, angles, cylinders, sawtooth, sprocketed collars, rings, threaded rings, squares, rivets, snaps, shackles, threaded turnbuckles, blocks, clamps, brackets, cleats or bollards. In aspects, the fasteners or hooks can be in fixed position (e.g., non-removable from the base 11) or detachable from the base 11 and reinstalled in various methods to achieve ease and accuracy of the final fixture or assembly. In aspects, the fasteners or hooks as described can also be uniform in shape and size or of varying shapes, sizes and angles to fit varying applications or uses.

In aspects, in addition to the fasteners comprising several shapes, the mounting bases can comprise various sizes, shapes, thicknesses, and compositions. In addition, the mounting base can be provided with markings such as dots, indentations, crosses, stars and the like to exhibit positions and also include lines, grids and dimensions to provide ease and accuracy in use. As illustrated in FIG. 22, any version of the mounting base can be provided with optional positioning pads, cushions, adhesive pads, contact adhesive, peel and stick adhesives, marker dots to impart an indentation or deposit color, holding magnets, double sided tape, hook-and-loop tape and the like. The mounting base designs with numerous available positions can be in the form of pre-drilled, pre-threaded, notches, slots, channels, tracks, shelves, grooves or taps to accommodate the insertion of pins, pegs, prongs, screws or other fasteners for greater strength and ease of use. In aspects, the multiple position square, rectangular or other shape base can be mounted vertically, laterally or horizontally on a wall, floor, ceiling, roof, mechanical device, equipment housing and the like. The base can also be adjusted in shape to be arced or curved to fit the geometry of the surface and the apparatus being secured thereto. Further, the fastener assembly can be used in upright position to provide suspension or hanging of an object, or the assembly can be inverted to achieve a restraint or holding function. Just as the fasteners can be detachable and re-positioned, the mounting base itself can also be configured for removal and reinstallation. A mounting base can be attached to a primary surface and can correspond to a mounting base attached to an object utilizing one or more fasteners.

Following FIGS. 25-34, rods, bars, tubes or beams of round, square, rectangular, triangular or other geometric shape of hollow or solid configuration can be mounted on bases with an array of grooves, notches, channels, tracks, shelves, brackets, extensions or hooks that correspond to the shape of the "rods." In aspects, the Z-hooks, J-hooks or other engineered fasteners can then be moved along the "rods" to achieve side-to-side adjustment, while the mounting pad "grooves" or notches provide vertical adjustment. Hooks can be designed with shapes to fit over the rods and provide solid support of the item being suspended, held, supported or restrained. The sliding fastener style can also be used in a single or fixed design. While the figures show various designs for use as a mounting base, in aspects, many of these bases, including but not limited to the example of FIG. 45 as modified in FIG. 55, can also be used in the reverse application on the back of a suspended or restrained item to allow alternate positioning with or onto an existing hook, pin, nail, screw or fixture. Applications can comprise, for example, mounting for a picture or display item, functional or decorative panels, structural pieces, brackets, slides, drawers, cabinets, tools, instruments, mechanical equipment, artist materials, curtain pull adjustment, as installed in inverted position, strapping restraints, use with awnings, tarpaulins, covers, lines, ropes, cables, safety belts, cargo straps, tie down straps and the like.

Figure 31:
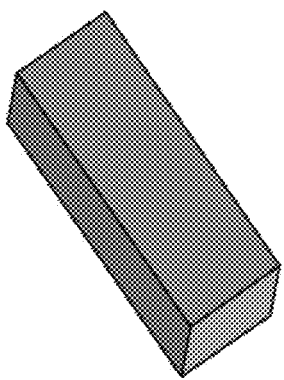
FIG. 31 schematically illustrates aspects of a fastener assembly in accordance with aspects of the disclosure.
Figure 32:
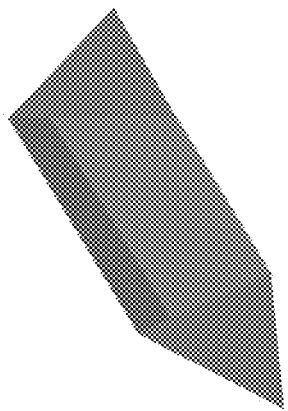
FIG. 32 schematically illustrates aspects of a fastener assembly in accordance with aspects of the disclosure.
Figure 54:
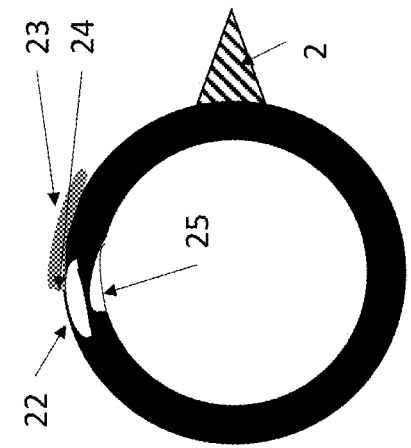
FIG. 54 schematically illustrates aspects of a fastener assembly in accordance with aspects of the disclosure.

The figures are described as follows: FIGS. 1, 2, 3 and 4 show several pre-positioned vertical hooks of different shapes. FIGS. 5, 6, 7 and 8 show several pre-positioned horizontal hooks of different shapes. FIGS. 9 and 10 show multiple pre-positioned vertical and horizontal hooks. FIGS. 11, 12 and 13 show a detachable, repositionable threaded pin in vertical design. FIGS. 10, 11 and 12 show a detachable, repositionable functional pin in vertical design. FIGS. 14, 15, 16 and 17 show a detachable, repositionable fastener or prong in vertical design. FIGS. 18, 19 and 20 show a detachable, repositionable vertical and horizontal functional peg design. FIG. 21 shows a horizontal base with multiple cleats in lateral use to hold a cable. FIG. 22 shows a mounting base with pre-positioned bar-supporting extensions. FIG. 23 depicts a 2-sided or angled fastener bar. FIG. 22A is the side view. FIG. 24 is a plan view of the functional angled sleeve fixture. FIG. 25 is the side view of the functional angled sleeve hook. FIG. 26 shows a side view of the mounting base with pre-positioned extension support brackets. FIGS. 27 and 28 depict square and triangular shaped rods respectively, along with corresponding multi-sided functional sleeve hooks. FIG. 29 represents a mounting base with an interconnected groove pattern to accommodate continuous adjustment of a compatible fastener. FIGS. 30 and 31 show the front and side view of a Z-hook, FIG. 32 is the side view of an L-hook option and FIG. 27d represents an S-hook. FIG. 41 shows a U-channel mounting base to allow ready adjustment of slide bar fastener or hook assembly. FIG. 42 is the top view showing an installed support bar with sliding J-hook, while FIG. 43 is the side view of the assembly and FIG. 44 depicts the J-hook. FIG. 46 presents a mounting base with various grooves or notches that could readily accept the placement of a range of fasteners, including the S-hook as presented in FIG. 40. FIG. 47 is the front view of a cylindrical base with inset notches or grooves. FIG. 48 is one example of a ring fastener. FIG. 49 is a side view of the cylinder base showing the inset notches, while FIG. 50 is a side view of a cylinder base using external support brackets. FIG. 51 shows a cylinder base with inset grooves and sprockets or teeth, which match the extensions or teeth in the ring on the example fastener of FIG. 51. FIG. 52 is an embodiment of a cylinder base which can be combined with the ring clamp fastener attachment illustrated in FIG. 53 (in open position) and FIG. 54 (in closed position). FIG. 53 shows the open position of a ring clamp fastener attachment, while FIG. 54 shows the closed position of this ring clamp. FIG. 55 shows the use of one type of mounting base in reverse position on the back of an item to allow multiple positioning with an existing fastener or fastener assembly.

It will be appreciated that the geometry of the rods can comprise one or more of the shapes that have been illustrated and described herein. In this way, a rod can be round and provide the fastener assembly in a ring-clamp design, with the end of the rod comprising a different geometry for the purposes of mounting. In aspects, the end of the rod can comprise a rectangular or square end. In aspects, a spring or tension-extension can be provided to correspond to the mounting position.

In aspects, the fastener assembly as described herein can comprise several benefits. For example, depending on the dimensions and material of the base, the fastener assembly can support objects of a relatively high weight. For example, the base can comprise a thickness that is greater than 1 centimeter (cm), or greater than 10 cm, or greater than 50 cm, or greater than 100 cm, etc. In addition, the base can comprise a relatively rigid material that is resistant to unintended deformation, for example, a metal material (e.g., steel, etc.), a wood material, etc. The fasteners that are attached to the base can likewise be of a rigid material (e.g., metal material, etc.). Due to the combination of the thickness of the base, the material of the base, and the material of the fastener, the fastener assembly can support objects that are greater than 1 kilogram (kg), greater than 10 kg, greater than 100 kg, or greater than 1000 kg. While supporting this weight, the fastener assembly may not undergo deformation or fracture, such that the objects can be supported for an extended period of time.

It should be understood that while various aspects have been described in detail relative to certain illustrative and specific examples thereof, the present disclosure should not be considered limited to such, as numerous modifications and combinations of the disclosed features are possible without departing from the scope of the following claims.

What is claimed is:

1. A fastener assembly comprising:
a base comprising a front face and a rear face such that a thickness of the base is defined between the front face and the rear face, the base comprising:
one or more mounting openings extending through the front face and the rear face; and
an elongated channel comprising:
a first channel segment extending along a first axis between an open first end and an opposing closed second end;
a second channel segment extending along a second axis, wherein the first axis is parallel to, and spaced apart from, the second axis; and
a third channel segment extending along a third axis that intersects the first axis and the second axis, wherein the third channel segment is connected to the first channel segment at a location that is between the open first end and the opposing closed second end of the first channel segment, and wherein the elongated channel comprises additional channel segments that are parallel to the first channel segment and the second channel segment, with the second channel segment positioned between the first channel segment and the additional channel segments;
a mounting fastener configured to be received within the one or more mounting openings, the mounting fastener comprising a length that is greater than the thickness of the base such that the mounting fastener extends through the mounting opening and engages a surface to attach the base to the surface;
one or more fasteners configured to be attached to the front face of the base, the one or more fasteners extending outwardly from the front face; and
a plurality of spacer pads attached to the rear face and spaced apart from one another, the plurality of spacer pads maintaining the rear face a distance apart from the surface when the base is attached to the surface, with the plurality of spacer pads in contact with the surface.

2. The fastener assembly of claim 1, wherein the one or more spacer pads comprise a first spacer pad positioned adjacent to a first lateral edge of the base, and a second spacer pad positioned adjacent to a second lateral edge of the base, the first spacer pad and the second spacer pad in contact with, and movable relative to, the surface, and wherein the location at which the third channel segment is connected to the first channel segment is spaced a first distance from the open first end and a second distance from the closed second end, and the second distance is less than the first distance, and wherein the third axis is perpendicular to the first axis and the second axis.

3. The fastener assembly of claim 1, wherein one or more of the base or the fastener comprises one or more of metal, plastic, wood, mdf, osb, plywood, pressed composite board, cardboard, composite board, formed cementitious or gypsum board, mineral filler, fiber, or other additive modified thermoplastic or thermoset composites, polymer materials comprising one or more of: ABS, PAN, acrylic/PMMA, vinyl/PVC, polyolefin/PP or PE, EPS, PET, PTFE, polycarbonate/PC, PLA, PVA, polyester, urethane or epoxy.

4. The fastener assembly of claim 1, wherein the base comprises a height that is greater than a width of the base.

5. The fastener assembly of claim 1, wherein the base comprises a width that is greater than a height of the base.

6. The fastener assembly of claim 1, wherein the surface further comprises an object that is suspended; and the one or more fasteners further comprise an existing fastener or fastener base on a primary surface, such that the assembly can adapt to a position of the existing fastener or fastener base on the primary surface.

7. The fastener assembly of claim 1, wherein the elongated channel comprises a first group of channel segments that are coaxial with the third channel segment, and a second group of channel segments that are parallel to, and not coaxial with, the third channel segment.

8. A fastener assembly comprising:
a base comprising a front face and a rear face such that a thickness of the base is defined between the front face and the rear face, the base comprising:
one or more mounting openings extending through the front face and the rear face; and
a plurality of fastener openings extending through the front face and at least partially through the thickness toward the rear face, wherein the plurality of fastener openings are joined together to form a single elongated channel that extends non-linearly along a plurality of axes and forms an open first end at a lateral edge of the base, the elongated channel comprising:
a first channel segment extending along a first axis of the plurality of axes between the open first end and an opposing closed second end;
a second channel segment extending along a second axis of the plurality of axes, wherein the first axis is parallel to, and spaced apart from, the second axis; and
a third channel segment extending along a third axis of the plurality of axes that intersects the first axis and the second axis, wherein the third channel segment is connected to the first channel segment at a location that is between the open first end and the opposing closed second end of the first channel segment, and wherein the elongated channel comprises additional channel segments that are parallel to the first channel segment and the second channel segment, with the second channel segment positioned between the first channel segment and the additional channel segments;
a mounting fastener configured to be received within the one or more mounting openings, the mounting fastener comprising a length that is greater than the thickness of the base such that the mounting fastener extends through the mounting opening and engages a surface to attach the base to the surface; and
a fastener configured to be received within one of the plurality of fastener openings, the fastener extending outwardly from the front face.

9. The fastener assembly of claim 8, further comprising one or more spacer pads attached to the rear face, the one or more spacer pads maintaining the rear face a distance apart from the surface when the base is attached to the surface.

10. The fastener assembly of claim 8, wherein one or more of the base or the fastener comprises one or more of metal, plastic, wood, mdf, osb, plywood, pressed composite board, cardboard, composite board, formed cementitious or gypsum board, mineral filler, fiber, or other additive modified thermoplastic or thermoset composites, polymer materials comprising one or more of ABS, PAN, acrylic/PMMA, vinyl/PVC, polyolefin/PP or PE, EPS, PET, PTFE, polycarbonate/PC, PLA, PVA, polyester, urethane or epoxy.

11. The fastener assembly of claim 8, wherein the plurality of fastener openings comprise a circular cross-sectional shape.

12. The fastener assembly of claim 8, wherein the plurality of fastener openings comprise an elongated cross-sectional shape.

13. The fastener assembly of claim 8, wherein the plurality of fastener openings extend through the front face and the rear face.

14. The fastener assembly of claim 8, wherein the single elongated channel comprises the open first end that passes through the lateral edge of the base, and an opposing end that is located at an interior of the base spaced apart from all lateral edges of the base, the single elongated channel extending non-linearly and uninterrupted between the open first end and the opposing end.

15. The fastener assembly of claim 14, wherein a first end of the third channel segment is attached to the first channel and an opposing second end of the third channel segment is attached to the second channel such that the third channel segment defines a continuous path between the first channel segment and the second channel segment, and the location at which the third channel segment is connected to the first channel segment is spaced a first distance from the open first end and a second distance from the closed second end, and the second distance is less than the first distance.

16. The fastener assembly of claim 8, wherein the surface further comprises an object that is suspended; and the one or more fasteners further comprise an existing fastener or fastener base on a primary surface, such that the assembly can adapt to a position of the existing fastener or fastener base on the primary surface.

\* \* \* \* \*